(12) United States Patent
Gyözö

(10) Patent No.: US 6,209,581 B1
(45) Date of Patent: Apr. 3, 2001

(54) SURFACE PLATE MIXING FAUCET GUIDED BY BALL TRANSFER TABLE

(75) Inventor: Baki Gyözö, Zenta (HU)

(73) Assignee: Kerox-Multipolar II. Kft (HU)

( * ) Notice: Subject to any disclaimer, the term of this patent is extended or adjusted under 35 U.S.C. 154(b) by 0 days.

(21) Appl. No.: 09/297,941
(22) PCT Filed: Mar. 13, 1998
(86) PCT No.: PCT/HU98/00024
§ 371 Date: May 10, 1999
§ 102(e) Date: May 10, 1999
(87) PCT Pub. No.: WO98/45630
PCT Pub. Date: Oct. 15, 1998

(30) Foreign Application Priority Data

Apr. 4, 1997 (HU) .................................................. 9700702

(51) Int. Cl.[7] ................................................. F16K 11/065
(52) U.S. Cl. ........................................ 137/625.4; 251/235
(58) Field of Search .......................... 137/625.4; 251/235

(56) References Cited

U.S. PATENT DOCUMENTS 3,415,281   12/1968   Perlman .

FOREIGN PATENT DOCUMENTS 3041696   6/1982   (DE) .
3245898   6/1984   (DE) .
0238674   9/1987   (EP) .
9005868   5/1990   (WO) .

Primary Examiner—John Fox
(74) Attorney, Agent, or Firm—Bachman & LaPointe, P.C.

(57) ABSTRACT

The mixing valve battery cartridge shown in the figures annexed is used for mixing liquids, primarily cold and warm water, having said cartridge one inlet disc (2) and one control disc (3) arranged one above the other and forming a plane sealing together, thus serving for controlling the mixing ratio and flow of liquids passing through; the inlet disc (2) arranged first in respect of flow direction is stationary and the control disc (3) arranged above the former is able to displace in its plane in any direction. The driving arm (8) insuring the planar displacement of the control disc (3) is in driving connection with a ceramic disc mover (4) being in driving connection with the (3) control disc, and is fastened in a bushing (6) in axial direction, being said bushing (6) is bordered by at least one spherical surface of rotational center (12)—preferably by an upper bushing surface (601) and/or lower bushing surface (602)—which rotational center (12) is located along the axis of the driving arm (8)—preferably below the ball end (81) of the driving arm (8)—beyond the driving arm (8) and the spherical surface or spherical surfaces of the bushing (6) is/are guided between the spherical spacer surface (51) of a spacer (5) and a spherical cover surface (72) of the cover (7) or at least by one of them.

10 Claims, 3 Drawing Sheets

SURFACE PLATE MIXING FAUCET GUIDED BY BALL TRANSFER TABLE

The invention relates to a mixing valve battery cartridge used for mixing cold and warm water, having said cartridge one inlet disc and one control disc arranged one above the other and forming a plane sealing together.

The invention is intended to implement a mechanism to mix cold and warm water as well as to release and shut off the water flow, respectively, which combines the advantages of mixing valves using either plane ceramic discs and or a sphere as control element. The mixing valves of plane disc are of long service life; however, due to their structural constraints, the outlet pipes of valve batteries have to bypass their inlet pipelines; therefore, their space requirement is high.

The mixing valves using spherical control element contain sliding sealing made of rubber or some rubber-like material which get damaged within short time; nevertheless, they are of low space requirement. A solution of this kind is described in U.S. Pat. No. 4,838,304.

The mixing valve with plane disc controlled by spherical segment does not contain elastic sliding sealing. The mixed water outlet is directed toward the outlet pipeline; thus, its mounting space requirement is low, while its service life is the same as the mixing valves using plane discs—all these features are added to the customary operational parameters and range of motion.

The invention implements the objective set that the upper control disc is driven by an arm in a manner that each point of the arm displaces along a spherical surface the center of which lies beyond the arm. This movement of the arm is insured by the fact that the lower and/or upper bushing surface are/is designed as a spherical surface, wherein said spherical surface is located next to a further spherical surface, preferably between two spherical surfaces, that is, between the lower surface of the cover and the upper surface of the spacer. The opening on the cover allows the driving arm to be moved together with the bushing while its lower end connected to the driving disc made of ceramics moves the latter into a position determined by the position of the driving arm, while also moving the control disc connected to the driving disc made of ceramics along a plane surface according to their guide.

In this embodiment, the driving arm can be freely rotated around its axis.

This embodiment allows one to implement valve batteries in which the driving arm controlling the flow and mixing ratio functions as a control stick.

Figure 2:
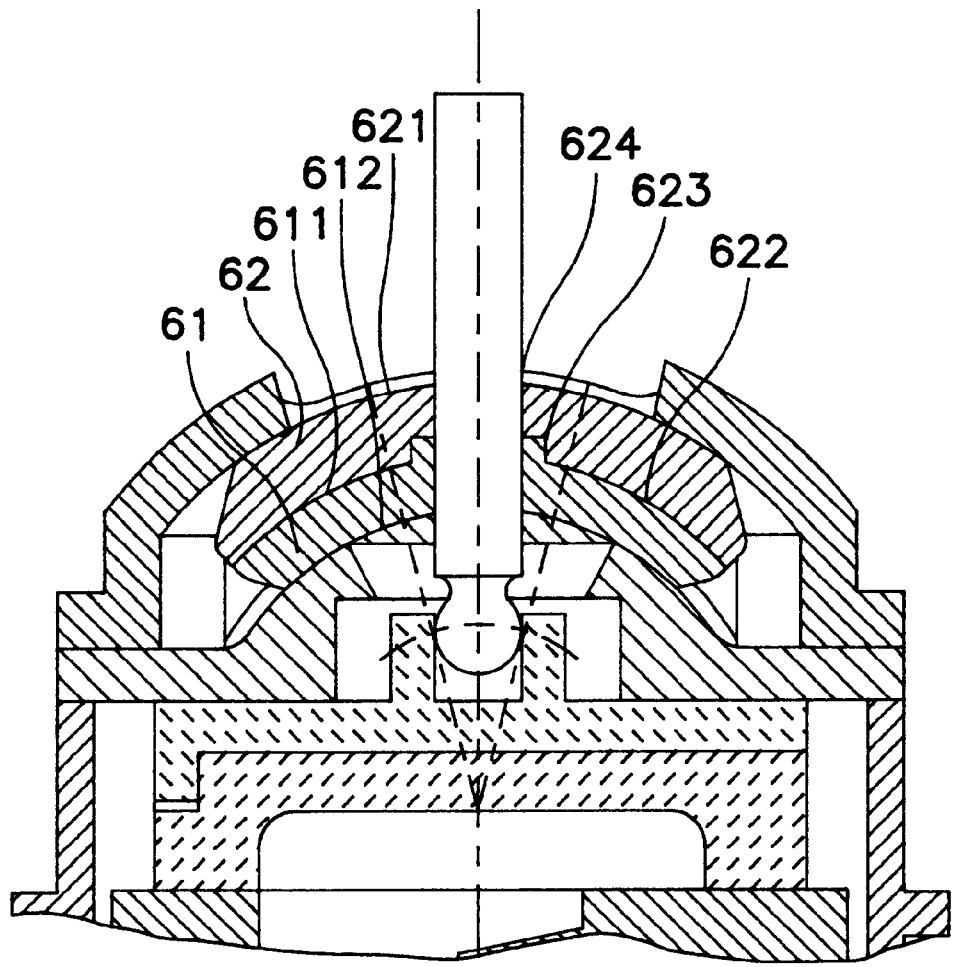

In order to mount a customary valve battery shaft as the driving arm, the driving arm shall be prevented from rotating around its axis. An exemplary solution is shown in FIG. 2 where the bushing that is made of a single piece in the basic embodiment is divided into two parts, i.e. the so called upper bushing which in itself has two spherical surfaces guided within the cover so as to allow the displacement along an arc only in the direction of closing and opening, on the one hand, and the lower bushing arranged below the upper bushing, which also has two spherical surfaces and moves together with the upper bushing in the direction of closing and opening, while it is guided in the upper bushing when moved at right angles to the direction of opening and closing to allow the mixing ratio to be controlled, on the other hand.

The valve battery cartridge according to the invention is described in detail, based on the figures annexed.

Figure 1:
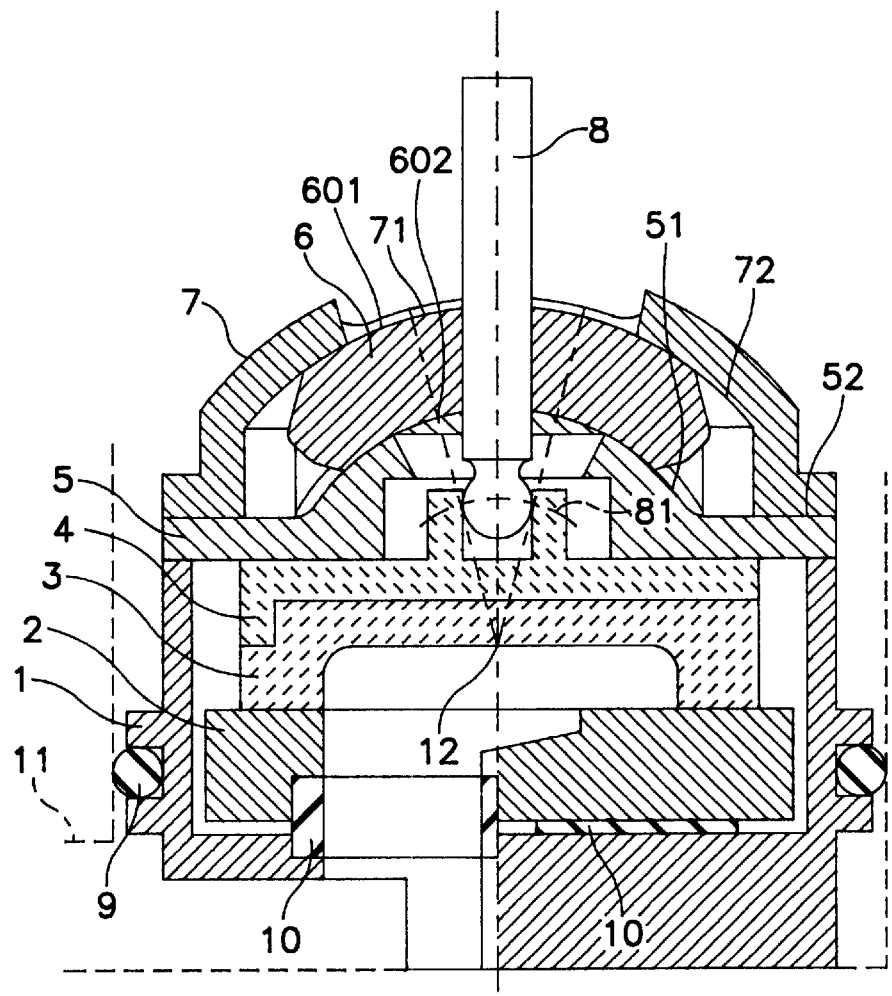

In the figures,

FIG. 1 shows the basic type of cartridge in sectional side view.

FIG. 2. shows an exemplary embodiment of the cartridge according to the invention, with shaft prevented from being rotated around its axis, in sectional side view.

Figure 3:
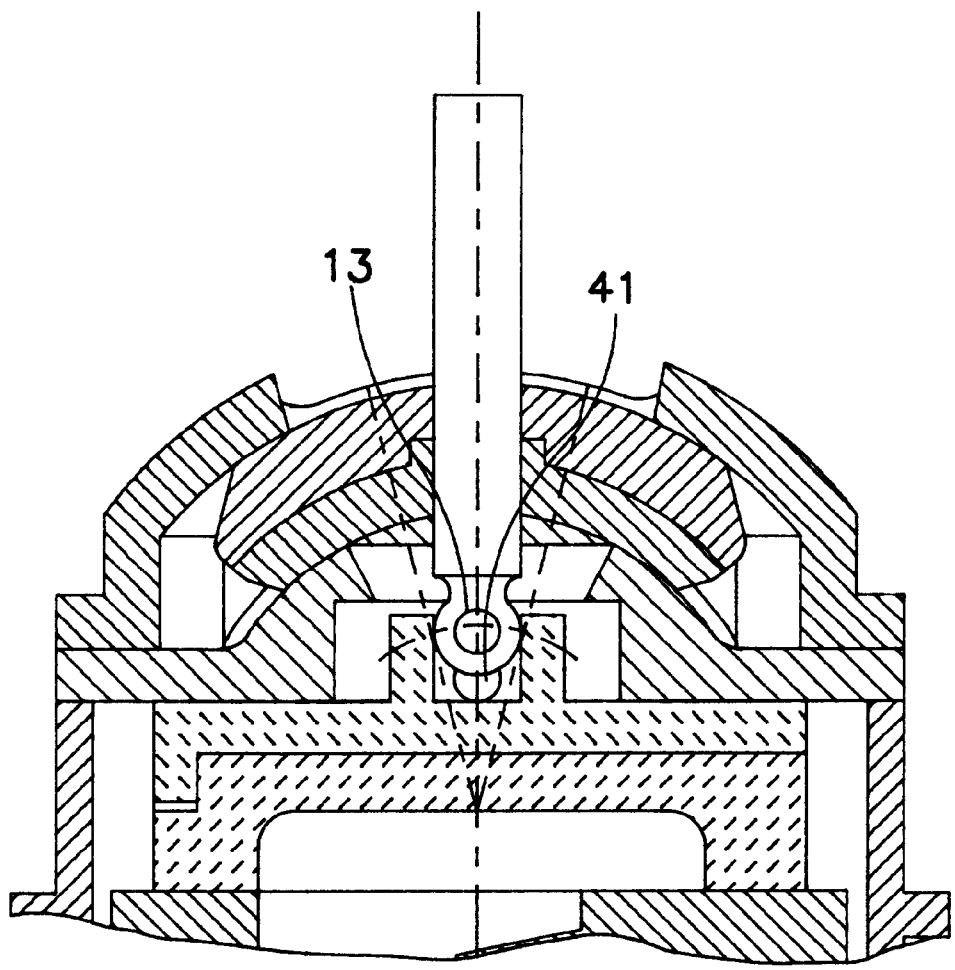

FIG. 3 shows an exemplary embodiment of the cartridge designed with driving disc made of ceramics and driving arm both prevented from being rotated, its upper part in sectional side view.

The function of the valve cartridge according to the invention is described below.

The sectional side view of the basic design of the valve cartridge according to the invention is shown in FIG. 1. At the bottom inside the housing 1, the inlet disc 2 that serves as inlet of both cold and warm water and outlet of mixed water is arranged, being the fluid containing space isolated from the atmosphere by means of the rubber sealing 10. Within the valve body 11, the housing 1 of the cartridge is isolated by means of the sealing ring 9 from the water outlet. Above the inlet disc 2, the control disc 3 movable along a plane surface on the inlet disc 2 is arranged, which allows the mixing ratio of cold- and warm water as well as the outlet flow rate to be controlled and shut-off, respectively. The two discs together form a plane sealing, with their sliding surfaces in contact polished. The control disc 3 is driven by means of the driving arm 8 guided by the bushing 6 and secured against axial displacement; the upper bushing surface 601 and the lower bushing surface 602 are of spherical shape the rotational center 12 of which lies along the axis of, but below the driving arm 8. The driving arm 8 is in driving connection with the ceramic disc mover 4, through the ball end 81 formed at the bottom of the driving arm 8, while the ceramic disc mover 4 is in driving connection with the control disc 3 arranged below it. The ceramic disc mover 4 can be moved by means of the driving arm 8, while guided by means of plane surface 52 of the spacer 5. The bushing 6 is guided by means of its upper bushing surface 601 and lower bushing surface 602 on the top and at the bottom between the spherical cover surface 72 of the cover 7 and the spherical spacer surface 51 of the spacer 5, respectively.

In this embodiment, the driving arm 8 can be operated as a control stick, and the limits of operation can be determined by the shape and size of the slot 71 shaped in the cover 7.

The upper part of another embodiment of the cartridge according to the invention with driving arm prevented from being rotated is shown in FIG. 2 in sectional side view. In this design, the driving arm 8 cannot be rotated; this design is necessary for the customary valve batteries provided with a single driving arm. Here, the bushing 6 consists of two pieces i.e. the lower bushing 61 and the upper bushing 62. The driving arm 8 is in driving connection with the lower bushing 61 and is prevented from being displaced in axial direction or turned in the lower bushing 61. The upper surface of lower bushing 61 slides on the lower surface 622 of the upper bushing 62, while the lower surface 612 of the lower bushing 61 slides on the spherical spacer surface 51 of the spacer 5. The upper surface 621 of the upper bushing 62 slides on the spherical cover surface 72 of the cover 7. Each spherical surface has its center at the rotational center 12. The upper bushing 62 is guided in lateral direction between plane surfaces in the cover 7, thus, it is allowed to perform motion only in the direction of opening and closing.

The lower bushing 61 is guided by the guide recess of upper bushing 623 within the upper bushing 62 in the direction perpendicular to the direction of opening and closing; thus, it can be moved together with the driving arm 8 connected to it in any direction along the spherical surface; it moves together with the upper bushing 62 in the direction of opening and closing while it is guided in the guide recess of upper bushing 623 when moving at right angles to the direction of opening and closing.

The movement of the arm in this direction is insured by the upper bushing groove 624 shaped in the upper bushing 62 according to the width of the arm. The limits of operation of the driving arm 8 that is prevented from being rotated around its axis in this case can be determined by means of the shape and size of the slot 71 shaped in the cover 7 as described above.

In the embodiments described so far, the end of driving arm 8 that protrudes into the ceramic disc mover 4 consists of a ball end 81 which allows the ceramic disc mover 4 and the control disc 3 connected to it to displace freely. Thus, proper control is insured only by using control disc 3 the control edge of which is of circular shape concentric with the center of the ball end 81.

Another possibility to modify the shape of pass-through holes of both the inlet disc 2 and control disc 3 is that the driving arm 8 prevented from being rotated around its axis is connected to the ceramic disc mover 4 so as to allow the ceramic disc mover 4 to move to any point on the plane, however, without allowing it to be rotated in relation to the driving arm 8.

This solution is presented in FIG. 3. In this embodiment, the pin 13 is inserted into the ball end 81 through its center and guided in the flute 41 of the ceramic disc mover 4, so as to function as a Cardan joint; which means that the pin 13 prevents the driving arm 8 to be rotated in relation to the ceramic disc mover 4.

The advantage of the solution according to the invention is that it combines the advantages of valve batteries using either having sealing plates made of ceramics or being controlled by spherical surfaces, with eliminating their disadvantages.

What is claimed is:

1. Mixing valve battery cartridge for mixing cold and warm water, which comprises:
   a stationary inlet disc;
   a movable control disc above the inlet disc and forming a sealing plane with the inlet disc, wherein the control disc is operative to control the mixing ratio and flow of liquids passing through the inlet disc;
   a ceramic disc mover in driving connection with the control disc;
   a movable driving arm in driving connection with the ceramic disc mover and fastened in a bushing, said arm having a driving end in driving relationship with said ceramic disc mover;
   at least one spherical bushing surface;
   wherein, the bushing and driving arm move together and movement of the bushing by the driving arm is guided by at least one further spherical surface, and wherein the driving arm has a driving arm axis and wherein the radii of the spherical bushing surface on both sides of the driving arm intersect each other beyond the end of the driving arm in line with the axis of the driving arm.

2. Mixing valve battery cartridge according to claim 1, including a spacer with a guiding spherical upper surface thereof above the ceramic disc mover, wherein the bushing has a spherical lower bushing surface contacting the guiding spherical upper surface of the spacer.

3. Mixing valve battery cartridge according to claim 1, including a cover with a guiding spherical lower cover surface thereof above the bushing, wherein the bushing has an upper spherical bushing surface contacting the guiding spherical lower surface of the cover.

4. Mixing valve battery cartridge according to claim 1, including a cover with a guiding spherical lower cover surface thereof above the bushing, and a spacer with a guiding spherical upper surface thereof above the ceramic disc mover and a spherical upper bushing surface of said bushing guided by the spherical lower cover surface, and a spherical lower bushing surface guided by the spherical upper spacer surface.

5. Mixing valve battery cartridge according to claim 1, wherein said bushing includes an upper first bushing part and a lower second bushing part.

6. Mixing valve battery cartridge according to claim 5, including a spacer with a guiding spherical upper surface thereof above the ceramic disc mover, wherein said lower second bushing part is defined by an upper spherical surface and a lower spherical surface, and wherein the lower spherical surface of the lower second bushing part contacts the spherical upper surface of the spacer.

7. Mixing valve battery cartridge according to claim 6, including a cover with a guiding spherical lower cover surface thereof above the bushing, wherein said upper first bushing part is defined by an upper spherical surface and a lower spherical surface, and wherein the upper spherical surface of the upper first bushing part contacts the spherical lower cover surface.

8. Mixing valve battery cartridge according to claim 7, including a guide recess in the upper first bushing part, wherein the lower second bushing part is in driving connection with the upper second bushing part through said driving recess.

9. Mixing valve battery cartridge according to claim 8, including a ball end on the driving end of said driving arm.

10. Mixing valve battery cartridge according to claim 9, including a flute in the ceramic disc mover and a pin in the center of the ball end on the driving end of the driving arm in driving connection with said flute.

* * * * *